UNITED STATES PATENT OFFICE 2,641,615

MIXED ACETALS OF 2-PROPYN-1-OL

Roger F. Kleinschmidt, Belvidere, N. J., assignor to General Aniline & Film Corporation, New York, N. Y., a corporation of Delaware No Drawing. Application January 22, 1952, Serial No. 267,705

6 Claims. (Cl. 260—615)

This invention relates to new chemical compounds which are mixed acetals of 2-propyn-1-ol and may be represented by the general formula:

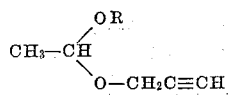

wherein R is an alkyl group of from 1 to 4 carbon atoms. These compounds are useful as intermediates in reactions involving the acetylenic bond, for they act to protect the alcohol group from entering into undesirable reactions. In the reaction products obtained therefrom the alcohol group may be regenerated readily by simple hydrolysis.

The art is familiar with the problem of preparing derivatives of 2-propyn-1-ol by reactions involving the acetylenic bond, such as the addition of alcohol groups to form ketals, the addition of thiols, inorganic acids, organic acids, and the like. The free alcohol group often interferes with reactions of this type. For instance, in attempting to prepare a ketal by the reaction of an alcohol with 2-propyn-1-ol in the presence of an acidic mercury catalyst, the ketal is not obtained. An intermediate product probably is formed by the addition of one mole of alcohol to the triple bond to give a vinyl ether, and such an intermediate probably undergoes bi-molecular self-condensation involving the free alcohol group to give a cyclic dioxane compound, instead of adding a second mole of alcohol to yield the desired ketal.

It has been suggested heretofore that the free alcohol group of 2-propyn-1-ol be converted to an ester or an ether or a formal, and this would also permit the formation of a ketal by reaction of 2 moles of an alcohol with the acetylenic bond of the 2-propyn-1-ol derivative. However, the conversion of these resulting products to the corresponding alcohols by hydrolysis is difficult.

It has been found, in accordance with the invention, that mixed acetals of 2-propyn-1-ol wherein the second alcohol group is an alkyl radical of 1 to 4 carbon atoms may be prepared in a convenient manner. These compounds readily undergo acetylenic type reactions with alcohols, thiols, organic acids, Grignard reagents, and the like; and the resulting compounds may be hydrolyzed readily to generate the primary alcohol group.

An important feature of these compounds is the presence of only one acetylenic bond in the molecule. By virtue thereof, salts of the acetylenic variety may be prepared in good yield, despite their low solubility in organic solvents. The saturated alkoxy group not only imparts solubility in organic solvents, but at the same time, does not enter into undesirable side reactions.

The objects achieved in accordance with the invention as described herein include the provision of mixed acetals of 2-propyn-1-ol wherein the second alkoxyl group contains an alkyl of from 1 to 4 carbon atoms; the provision of mixed acetals of 2-propyn-1-ol in which the acetylenic portion of the molecule may undergo further reaction, and give derivatives which are readily hydrolyzed to generate a primary alcohol group; and other objects which will be apparent as details or embodiments of the invention are set forth hereinafter.

The compounds of the invention may be prepared by reacting a lower alkyl vinyl ether with an alcohol in the presence of an acidic catalyst, such as p-toluene sulfonic acid, or boron trifluoride etherate. It is desirable to use an inert solvent such as benzene or the like in the reaction mixture to dilute the reactants and modify the intensity of the reaction.

In order to facilitate a clear understanding of the invention, the following preferred specific embodiments are included:

Example 1

Through a stirred solution of 224 parts by weight of 2-propyn-1-ol in 750 parts dry benzene, containing 2 parts p-toluene sulfonic acid as catalyst, was passed methyl vinyl ether for 6 hours with occasional cooling to maintain a temperature of about 20° C. until 232 parts had been absorbed. After another hour of stirring, the catalyst was neutralized with sodium methylate.

The reaction mixture was filtered, the solvent removed by distillation and the residue fractionated. The product obtained was 225 parts (49% yield) of methyl 2-propynyl acetal, B. P. 127.5–128° C. $n_D^{25}$—1.4133; $d_4^{25}$—0.9248. Analysis—Calculated for $C_6H_{10}O_2$: C, 63.2; H, 8.8. Found: C, 64.00; H, 8.79.

As a by-product, 77 parts di-2-propynyl acetal was also obtained.

Example 2

To a stirred solution of 112 parts 2-propyn-1-ol and 375 parts benzene containing 1 part of p-toluene sulfonic acid, was added slowly 144 parts redistilled ethyl vinyl ether while maintaining the reaction temperature between 20–25° C. by occasional cooling. After stirring for two hours, sodium methylate was added in excess to neutralize the catalyst. After filtration and removal of the benzene by distillation, 96 parts of ethyl 2-propynyl acetal was obtained as the product, B. P. 138–140° C., $n_D^{25}$—1.4135. There was also obtained as a by-product about 20 parts of di-2-propynyl acetal.

*Example 3*

200 parts of butyl vinyl ether were employed in the same procedure as described in Example 2, yielding as the product 225 parts of butyl 2-propynyl acetal, B. P. 92–96° C./43–47 mm. $n_D^{25}$—1.4202–1.4246. Analysis—Calculated for $C_9H_{16}O_2$: C, 69.20; H, 10.26. Found: C, 69.13; H, 10.14.

*Example 4*

The procedure of Example 2 was repeated except that 200 parts of isobutyl vinyl ether was employed in place of 144 parts of ethyl vinyl ether, thereby yielding as the product isobutyl propynyl acetal.

Following this procedure, except substituting an equivalent amount of propyl- or iso-propyl vinyl ether, there is obtained as the product the corresponding propyl- or iso-propyl propynyl acetal.

Other acidic type catalysts may be used, such as strong acids incapable of reacting with the acetylenic bond under the conditions of the reaction, such as mineral acids (e. g. sulfuric acid, phosphoric acid) and strong organic acids e. g. methanesulfonic acid, benzene sulfonic acid and the like.

The fractionated products obtained in accordance with these examples, may be treated with appropriate reagents for reaction with the acetylenic bond, to prepare the corresponding derivatives; which in turn may be hydrolized to generate primary alcohol compounds.

It is intended to include within the invention all variations and modifications of the foregoing disclosures, as will be apparent to one skilled in the art, and coming within the scope of the appended claims.

I claim:

1. New compounds represented by the formula:

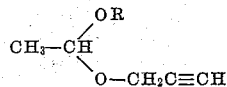

wherein R is an alkyl group of from 1 to 4 carbon atoms.

2. A compound of claim 1, wherein R is methyl.
3. A compound of claim 1, wherein R is ethyl.
4. A compound of claim 1, wherein R is n-propyl.
5. A compound of claim 1, wherein R is n-butyl.
6. A compound of claim 1, wherein R is i-butyl.

ROGER F. KLEINSCHMIDT.

References Cited in the file of this patent

UNITED STATES PATENTS

| Number | Name | Date |
| --- | --- | --- |
| 2,563,325 | Fahnoe | Aug. 7, 1951 |

OTHER REFERENCES

Grard: Comptes Rendus (French), vol. 189, pp. 925–27 (1929).